United States Patent
Chan et al.

(10) Patent No.: US 7,089,242 B1
(45) Date of Patent: Aug. 8, 2006

(54) METHOD, SYSTEM, PROGRAM, AND DATA STRUCTURE FOR CONTROLLING ACCESS TO SENSITIVE FUNCTIONS

(75) Inventors: Gary Dennis Chan, Fremont, CA (US); Lynda A. Hansen, San Jose, CA (US); Chi-Pei Michael Hsing, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/515,021

(22) Filed: Feb. 29, 2000

(51) Int. Cl.
G06F 7/00 (2006.01)

(52) U.S. Cl. .............................. 707/9; 707/103; 717/116
(58) Field of Classification Search .................... 707/9, 707/10, 100, 103; 709/102, 225, 229, 331, 709/332; 717/116; 710/200, 240; 713/200, 713/202
See application file for complete search history.

(56) References Cited

U.S. PATENT DOCUMENTS

| | | | | |
|---|---|---|---|---|
| 5,546,584 A | * | 8/1996 | Lundin et al. ............... 709/315 |
| 5,615,400 A | * | 3/1997 | Cowsar et al. .............. 709/332 |
| 5,832,226 A | | 11/1998 | Suzuki et al. .......... 395/200.53 |
| 5,848,232 A | * | 12/1998 | Lermuzeaux et al. ....... 713/201 |
| 5,901,315 A | | 5/1999 | Edwards et al. ............ 395/704 |
| 5,911,069 A | * | 6/1999 | Beard ......................... 709/315 |
| 5,953,527 A | * | 9/1999 | Cable ......................... 717/108 |
| 6,052,732 A | * | 4/2000 | Gosling ...................... 709/229 |
| 6,058,396 A | * | 5/2000 | Birze et al. ............. 707/103 R |
| 6,112,025 A | * | 8/2000 | Mulchandani et al. ...... 709/331 |
| 6,125,447 A | * | 9/2000 | Gong .......................... 713/201 |
| 6,131,165 A | * | 10/2000 | Lipkin et al. ............... 713/201 |
| 6,138,238 A | * | 10/2000 | Scheifler et al. ............ 709/225 |
| 6,308,181 B1 | * | 10/2001 | Jarvis ......................... 707/102 |
| 6,314,425 B1 | * | 11/2001 | Serbinis et al. ............... 705/26 |
| 6,334,158 B1 | * | 12/2001 | Jennyc et al. ............... 709/328 |
| 6,338,069 B1 | * | 1/2002 | Ghatate .................. 707/103 R |
| 6,385,722 B1 | * | 5/2002 | Connelly et al. .............. 713/2 |
| 6,385,724 B1 | * | 5/2002 | Beckman et al. ........... 713/167 |
| 6,412,020 B1 | * | 6/2002 | Leach et al. ................ 709/316 |
| 6,412,070 B1 | * | 6/2002 | Van Dyke et al. .......... 713/200 |
| 6,446,069 B1 | * | 9/2002 | Yaung et al. ................... 707/9 |
| 6,446,259 B1 | * | 9/2002 | Brett .......................... 717/165 |
| 6,463,581 B1 | * | 10/2002 | Bacon et al. ............... 717/154 |
| 6,496,865 B1 | * | 12/2002 | Sumsion et al. ............ 709/229 |
| 6,516,315 B1 | * | 2/2003 | Gupta ........................... 707/9 |
| 6,526,412 B1 | * | 2/2003 | Carey et al. ................... 707/2 |
| 6,526,565 B1 | * | 2/2003 | Nally ......................... 717/108 |
| 6,526,571 B1 | * | 2/2003 | Aizikowitz et al. ......... 717/154 |

FOREIGN PATENT DOCUMENTS

GB 2330222 4/1999

OTHER PUBLICATIONS

"Controlling Access to Members of a Class", The Java™ Tutorial, retrieved from the Internet: <URL:http://java.sun.com/docs/books/tutorial/java/javaOO/accesscontrol.html, pp. 1–5.
C.S. Herstmann et al., *Core Java 1.2 Volume 1–Fundamentals*, Prentiss Hall PTR, 1999, Chap. 11, pp. 583–622.

* cited by examiner

*Primary Examiner*—Greta Robinson
*Assistant Examiner*—Miranda Le
(74) *Attorney, Agent, or Firm*—David W. Victor; Konrad Raynes & Victor

(57) ABSTRACT

Provided are a method, system, and program for controlling access to a sensitive function in a class. A friend object is generated indicating objects from external classes external to the class including the sensitive function. The objects indicated in the friend object are capable of being modified during runtime. A call from an external function in one class external to the class including the sensitive function is processed during runtime. The calling function is permitted access to the sensitive function if the friend object indicates that the calling function can access the sensitive function.

22 Claims, 2 Drawing Sheets

METHOD, SYSTEM, PROGRAM, AND DATA STRUCTURE FOR CONTROLLING ACCESS TO SENSITIVE FUNCTIONS

BACKGROUND OF THE INVENTION

1. Field of the Invention

The present invention relates to a method, system, and program for controlling access to a sensitive function that is a member of a class.

2. Description of the Related Art

In the prior art JAVA computer programming language, the programmer can specify the level of access other functions have to functions within another class of objects and functions. Java is a trademark of Sun Microsystems, Inc. The terms "methods" and "functions" are used herein to refer to programs that perform specific operations. A class is a blueprint or prototype that defines the variables and functions (methods) common to all objects of a certain kind. In the JAVA programming language, a group of classes can be grouped and associated resources can be organized into a package, which makes classes easier to manage, helps avoid naming conflicts, and control access. A package is a collection of related classes and interfaces that provides access protection and namespace management.

Classes can protect their member methods and functions from access by other objects. The programmer would add access specifies in the class declaration to protect both a class's variables and its methods. The JAVA language supports four distinct access levels for member methods: private, protected, public, and, if left unspecified, package. A class in all situations has access to its own members.

The most restrictive access level is private. A private member is accessible only to other members in the class in which it is defined. A member, i.e., method or data object, can only be used by other members of the same class. This includes variables that contain information that if accessed by an outsider could put the object in an inconsistent state, or methods that, if invoked by an outsider, could jeopardize the state of the object or the program in which it's running. A member of a class declared as protected can be accessed by members of the same class, subclasses, and all classes in the same package. A member of a class declared as public can by accessed by any class in any package. The package access level allows classes in the same package to access any members within classes grouped in the package. This level of access assumes that classes in the same package are trusted friends. The package access level is the default access level if another access level is not specified.

In the prior art JAVA programming language, one way to limit access to a sensitive function is to declare the sensitive function public and not publish any information about the sensitive function. However, this technique will not prevent hackers from learning about the sensitive function and from maliciously utilizing the sensitive object. Another current solution is to copy the sensitive function to all packages that need to use the function. However, this approach often leads to complications because functions may call further functions, and copying one function in a chain to the packages will not necessarily allow the external calling function in another package access to the nested functions. Access can also be limited by declaring the sensitive function protected so that only functions in a class that inherit the properties of the class including the sensitive function can access the sensitive function. However, this technique requires that inheritance be declared, which can be problematic if the developer only wants to provide access to one sensitive function in a class and not all functions in the class. Thus, there is a need in the JAVA programming language to provide greater flexibility in controlling access to sensitive functions than is currently available with the current four access level options, i.e., public, private, protected, and package.

The prior art C++ programming language does not provide the concept of a package of classes. C++ allows class members to be declared as private so only other members of the same class as the private class member can access the class. A C++ class member declared as protected can only can only be used inside the class in which it is declared or in any derived or inheriting classes. The prior art C++ programming language also provides the concept of "friends", which allows members of external classes to have access to a private member of another class. The friend declaration appears in the class that contains the private member, and declares an external function in another class which has access. C++ applies the friends definition during compilation. If, during compilation, a member in one class attempts to access a member in another class, then the friends definition will be examined. If the calling member in the external class is not declared as a friend, then the compilation will fail.

Although C++ provides a mechanism to limit access to specified members of another class, the C++ friends technique is not flexible in that the binding of members of one class to members of another class occurs at compilation time and cannot be altered during runtime.

Thus, there is a need in the art to provide more freedom to control access to members of a class, e.g., methods and function, in object oriented programming languages such as JAVA and C++.

SUMMARY OF THE PREFERRED EMBODIMENTS

To overcome the limitations in the prior art described above, preferred embodiments disclose a method, system, and program for controlling access to a sensitive function in a class. A friend object is generated indicating functions from external classes external to the class including the sensitive function. The objects indicated in the friend object are capable of being modified during runtime. A call from an external function in one class external to the class including the sensitive function is processed during runtime. The calling function is permitted access to the sensitive function if the friend object indicates that the calling function can access the sensitive function.

In further embodiments, the sensitive function may include a check function statement indicating one friend object followed by at least one statement performing operations associated with the sensitive function. In such case, determination of whether the indicated friend object permits access to the sensitive function occurs upon executing the check function statement after processing the call to the sensitive function. Permitting access to the sensitive function comprises executing the statements in the sensitive function following the check function statement.

Still further, each sensitive function is capable of being associated with at least one of multiple friend objects. In such case, each of the associated multiple friend objects indicates a different set of external functions that can access the sensitive function that includes a check statement that is called with the friend object.

In still further embodiments, modifying the functions indicated in the friend object during runtime may occur when processing conditional logic in a function external to the sensitive function.

Preferred embodiments provide a method, system, and program for controlling access to a sensitive function to limit access to specified functions in external classes. Preferred embodiments are particularly useful for the JAVA programming language to allow specified external functions in packages and classes external to the class including the sensitive function to access the sensitive function.

Further, with preferred embodiments, the content of the friend object, e.g., packages, classes and/or functions, may be modified during runtime according to conditional logic. With this feature, the content of the friend object may be altered during runtime operations and dependent on current operational states of the program. This allows dynamic modification of the external functions listed in a friend object that can access a sensitive function.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
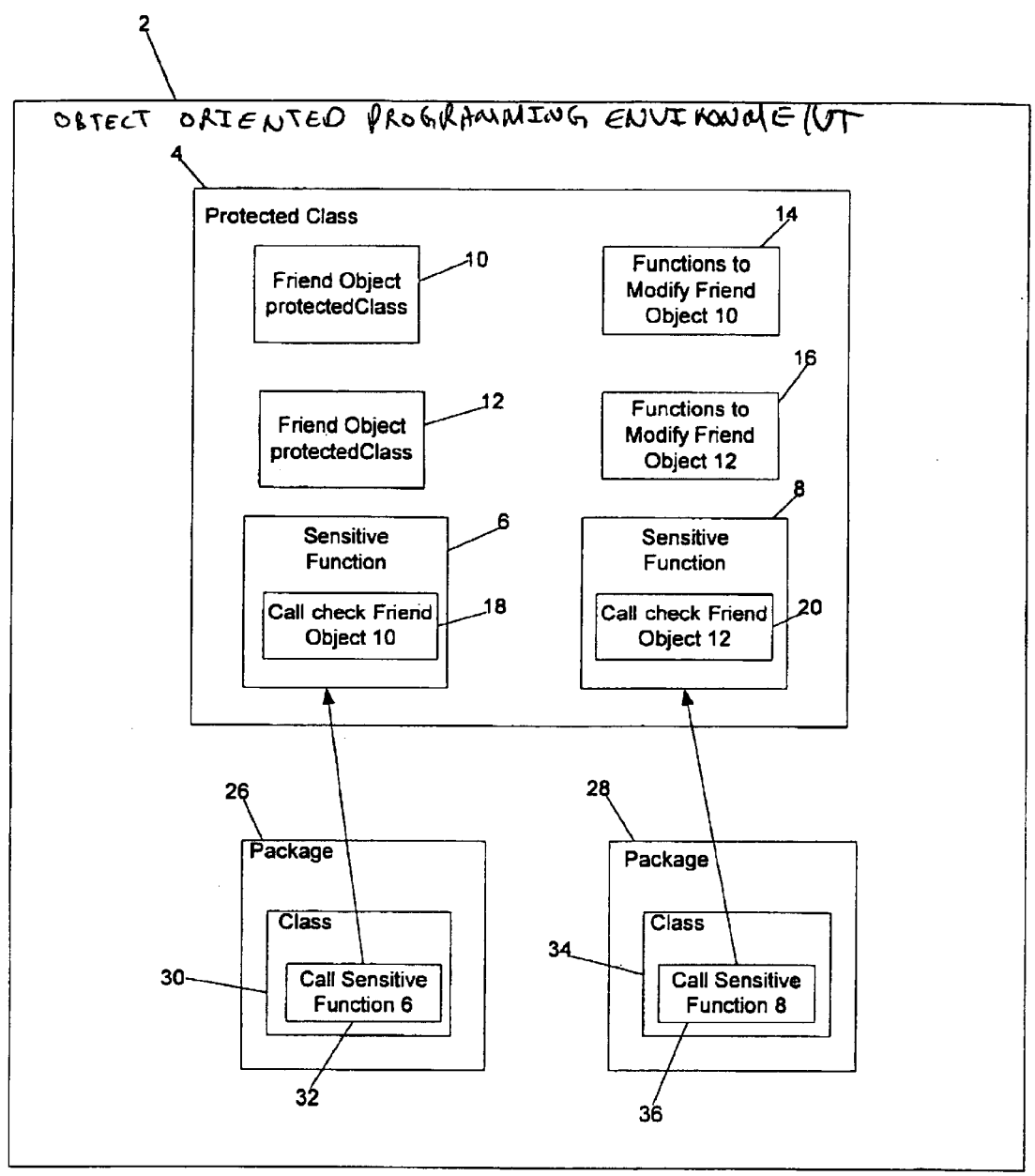
FIG. 1 illustrates an arrangement of program elements in accordance with preferred embodiments of the present invention.

In the following description, reference is made to the accompanying drawings which form a part hereof and which illustrate several embodiments of the present invention. It is understood that other embodiments may be utilized and structural and operational changes may be made without departing from the scope of the present invention.

Preferred embodiments are implemented in an object oriented programming language such as JAVA, C++, or any other object oriented programming language known in the art. Preferred embodiments provide a "Friends" class that is used to define a level of access to a method or function to limit access to specific functions in a class, all the members of a class or all the members within a package. As discussed, in JAVA, a package comprises a grouping of logically related classes. In this way, with the preferred embodiment Friends class, access may be limited to all the member functions in an external package, class and/or specified functions in another package. The Friends class provides the programmer a tool to control access to particular sensitive class functions by limiting access to specified members of external classes or packages. As used herein, the term "sensitive function" refers to a function or method of a class to which access is restricted.

The Friends class has the following seven external functions for software developers to use:

public Friends( ): Is used to construct a friends object for a class. More than one friends object may be constructed for a class to provide different levels of access for different sensitive functions in the class.

public void registerFriendFunction(String functionName): registers another function (functionName) as a friend in a friend object, such that an instance of the modified friend object that is used to control access to a sensitive function allows the specified function (functionName) access to the sensitive function.

public void registerFriendClass (String clsName): registers a class (clsName) as a friend in a friend object, such that an instance of the modified friend object that is used to control access to a sensitive function will allow all member functions of the added class (clsName) access to the sensitive function.

public void registerFriendPackage (String pkgName): registers a package (pkgName) as a friend in a friend object, such that an instance of the modified friend object that is used to control access to a sensitive function will allow all member functions of all classes in the added package (pkgName) access to the sensitive function. As discussed, in the JAVA programming language, a package comprises a logical grouping of related classes.

public void removeFriendFunction(String functionName): removes a function (functionName) from a friend object, such that an instance of the modified friend object that is used to control access to a sensitive function will no longer allow the removed function access to the sensitive function.

public void removeFriendClass (String clsName): removes a class (clsName) from a friend object, such that an instance of the modified friend object that is used to control access to a sensitive function will no longer allow the member functions of the removed class (clsName) access to the sensitive function.

public void removeFriendPackage(String pkgName): removes a package (pkgName) from a friend object, such that an instance of the modified friend object that is used to control access to a sensitive function will no longer allow the member functions of classes in the removed package (pkgName) access to the sensitive function.

public void checkFriend( ): A sensitive function would include this statement at the beginning of the function before other statements in the function. Whenever the sensitive function is called, the checkFriend( ) function determines whether the calling function to the sensitive function is registered in the Friend Object.

To implement the Friends class, another class would instantiate one or more friend objects. The friend objects instantiated in a class could be used to control access to one or more members of the class in which the friend object(s) is instantiated. The register and remove functions would be used to add and remove, respectively, functions, classes and/or packages to each instantiated friend object. Any of the functions in the class in which the friend object(s) is created may refer to the friend object(s) to limit access to those specified friends. In this way, different functions in a single class using different friend objects could allow different functions external to the class access to the sensitive functions.

FIG. 1 illustrates the relationship of objects in accordance with the preferred embodiments. An object oriented programming environment 2 includes a protected class 4 that includes sensitive function 6 and 8. Within the protected class 4, two friend objects 10 and 12 are instantiated. The protected class 4 further includes functions 14 and 16 to modify friend objects 10 and 12, respectively. The functions 14 and 16 would comprise one or more of the register and remove external functions described above. The external register and remove functions to modify the contents of a friend object may be called from functions (methods) in external classes. Moreover, the external register and remove functions may further be embedded in conditional logic statements in an external program. In this way, during runtime, friend objects may be dynamically modified based on the occurrence of runtime conditions and states.

The protected class 4 includes two sensitive functions 6 and 8 that each include a check friend call 18 and 20 to friend objects 10 and 12, respectively. Packages 26 and 28 are in separate JAVA packages from the protected class 6. Package 26 includes class 30 that includes a call 32 to sensitive function 6. Similarly, package 28 includes class 34 that includes a call 36 to sensitive function 8. The calls 32 and 36 to the sensitive functions 6 and 8 may be within functions within the classes 30 and 36, respectively. The friend objects 10 and 12 may list different packages, classes and/or functions as friends. In this way, the friend objects 10 and 12 may allow different sets of external functions to access sensitive functions 18 and 20. For instance, the class 30 or function including the call 32 to function 6 may be listed as a friend in friend object 10, but not friend object 12, whereas the class 34 or function including the call 36 to function 8 may be listed as a friend in friend object 12, but not friend object 10. In JAVA implementations, the preferred embodiment Friend class allows the programmer to restrict external function access to sensitive functions. Further, different friend objects may provide different levels of access to different functions in the same class, as shown in FIG. 1.

Figure 2:
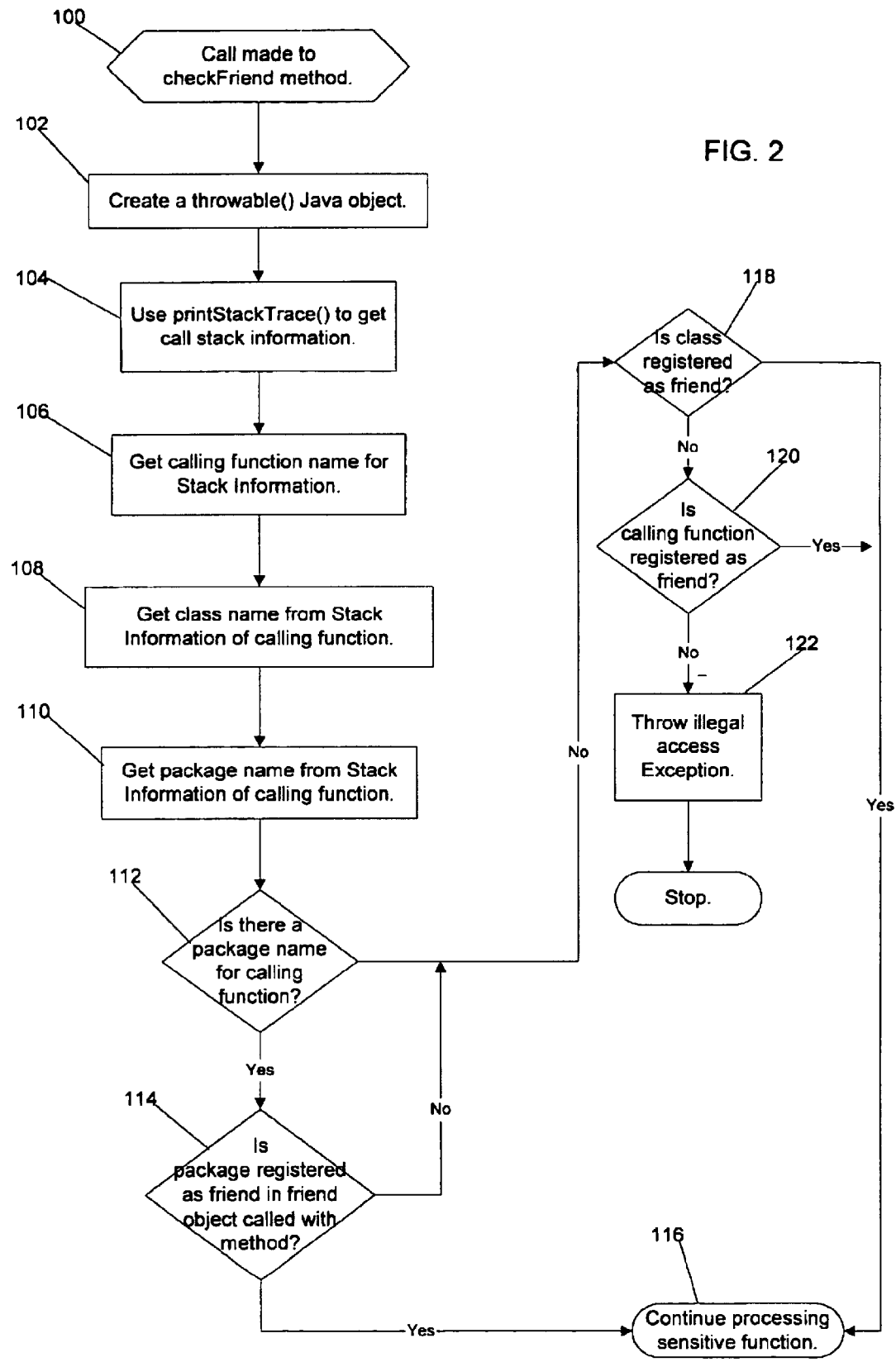
FIG. 2 illustrates logic implemented to determine whether to permit an external calling function access to a sensitive function in accordance with preferred embodiments of the present invention.

FIG. 2 illustrates logic implemented in the checkFriend-.Java program to perform the friend checking within a called function. Control begins at block 100 with a call being made to the checkFriend method within a sensitive function. For instance, if the friend object subject to the checking is named friendobjectA, then the call to the checkFriend method would comprise "friendobjectA.checkFriend( )". In preferred embodiments, the programmer would place the call to the checkFriend method at the beginning of the sensitive function, thereby not executing any of the program statements in the sensitive function until the particular friend object called with the checkFriend method has been checked. The checkFriend method would then create (at block 102) a throwable( ) JAVA object as part of determining the identity of the calling function. The checkFriend method then uses (at block 104) the print StackTrace( ) method of the throwable object, in a manner known in the art, to obtain a stack trace, which would include information on the calling function. Further details on throwable objects and obtaining a stack trace are described in the publication "Core Java, Volume—Fundamentals", by C. S. Horstmann and Gary Cornell, ISBN No. 0-13-081933-6 (Copyright Sun Microsystems, Inc., 1999), which publication is incorporated herein by reference in its entirety. In preferred implementations, the throwable object calls the native method fillinStackTrace( ) to collect the stack information and dump the stack information to a character string. Because the native method fillinStackTrace( ) is part of the JAVA virtual machine, it will allow the checkFriend method to operate across operating system platforms. Each operating system and programming language provide different methods for checking the stack, which would be used in alternative embodiments involving different programming languages and operating systems.

From the stack trace information obtained at block 104, the checkFriend( ) method would obtain for the calling function, if available, the calling function name (at block 106), the class name (at block 108), and the package name (at block 110). The checkFriend( ) method then determines (at block 112) whether there is a package name with the calling function, i.e., whether the calling function is within a class grouped within a package. If so, then the checkFriend( ) method determines (at block 114) whether the package is registered as a friend in the friend object called with the checkFriend( ) method. If the package is registered, then control passes to block 116 where the statements in the sensitive function following the call to the checkFriend method are processed.

Otherwise, if there is no package name for the calling function (at block 112) or if the package is not registered as a friend (at block 114), then control transfers to block 118 where the checkFriend( ) method determines (at block 118) whether the class of the calling function is registered as friend in the friend object subject to the checking. If not, then the checkFriend( ) method determines (at block 120) whether the calling function name is registered as a friend in the subject friend object. If either the class name or function name of the calling function is registered as a friend in the Friend object subject to the checking, then control transfers to block 116 to continue processing the sensitive function. If neither the class nor function is registered as a friend, then the checkFriend( ) method throws an illegal access exception to signal that an illegal operation has been performed in that a calling function does not have access to a sensitive function.

With preferred embodiments, the checkFriend method is called during runtime when a function attempts to access another function in a different class or package. This allows for dynamic checking during runtime. As discussed, the functions to register and remove friends from a friend object, listed above, may be called at different points of execution of the program and may be subject to conditional logic. Thus, it is possible that at certain points during execution a function will be listed as a friend and that at other instances it will not be listed as a friend that has access to a sensitive function. Thus, the friend object access list is dynamic.

The friend object is used internally within a class to check any calls from external functions. Because a friend object can specify packages, classes and/or particular functions, access can be granted to a limited number of external functions, regardless of where those functions are located, e.g., in different external classes and/or packages. Moreover, a programmer may instantiate multiple friend objects for a class, and then have different sensitive functions within the class check against the different friend objects for the class. In this way, different friend objects allow different sets of packages, classes and/or functions access to different sensitive functions.

JAVA implementations of the preferred embodiments thus provide improvements over the current art in allowing the programmer to permit access to specified external functions and to allow modification of the external functions that have access during program execution according to the current operational states.

C++ implementations of the preferred embodiments provide improvements over the current art by allowing for dynamic friend checking during runtime, i.e., when the program is being executed, thereby allowing the levels of access to be altered during runtime according to runtime operational states. This is an improvement over current C++ art where the friends are determined during compile time, i.e., when the objects are being compiled, and thus cannot be altered or modified during runtime.

CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

Preferred embodiments were described with respect to providing access control for the JAVA and C++ computer languages. However, the access techniques of the preferred embodiments may apply to language environments other than Java and C++.

Preferred embodiments described the steps of FIG. 2 as occurring in a particular order. However, in alternative embodiments the order of the steps may be modified and steps may be added or removed in accordance with the preferred embodiments of the present invention.

In summary, preferred embodiments disclose a method, system, and program for controlling access to a sensitive function in a class. A friend object is generated indicating functions from external classes external to the class including the sensitive function. The external functions indicated in the friend object are capable of being modified during runtime. A call from an external function in one class external to the class including the sensitive function is processed during runtime. The calling function is permitted access to the sensitive function if the friend object indicates that the calling function can access the sensitive function.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

**Java is a trademark of Sun Microsystems, Inc.

What is claimed is:

1. A method for controlling access to a sensitive function in a class, comprising:

generating a friend object indicating external functions from external classes external to the class including the sensitive function, wherein the external functions indicated in the friend object are capable of being modified during runtime, wherein the sensitive function is capable of being associated with at least one of multiple friend objects, and wherein the sensitive function includes a check function statement indicating at least one friend object followed by at least one statement performing operations associated with the sensitive function;

processing a call from a function in a class external to the class including the sensitive function during runtime;

executing the check function statement in the sensitive function in response to processing the call to the sensitive function;

determining whether the at least one friend object indicated in the executed check function statement indicates that the calling function is one of the indicated external functions that can access the sensitive function, wherein each of the at least one associated multiple friend objects indicates a different set of external functions that can access the sensitive function; and permitting the calling function access to the sensitive function in response to determining that the at least one friend object indicates that the calling function is one of the indicated external functions by executing the at least one statement in the sensitive function following the check function statement.

2. The method of claim 1 implemented using the Java programming language.

3. The method of claim 1, wherein a package defines a grouping of related classes, wherein the sensitive function is a member of one package that is different from another package with which the calling function is associated.

4. The method of claim 3, wherein the friend object is capable of indicating at least one package, class, and external function, wherein all functions within all classes within one indicated package comprise the indicated external functions that can access the sensitive function, wherein all functions within one indicated class can access the sensitive function, and wherein the indicated external functions can access the sensitive function.

5. The method of claim 1, wherein modifying the external functions indicated in the friend object during runtime occurs when processing conditional logic in a function external to the sensitive function.

6. A system for controlling access to a sensitive function in a class, comprising:

means for generating a friend object indicating external functions from external classes external to the class including the sensitive function, wherein the external functions indicated in the friend object are capable of being modified during runtime, wherein each sensitive function is capable of being associated with at least one of multiple friend objects, and wherein the sensitive function includes a check function statement indicating at least one friend object followed by at least one statement performing operations associated with the sensitive function;

means for processing a call from a function in a class external to the class including the sensitive function during runtime;

executing the check function statement in the sensitive function in response to processing the call to the sensitive function;

means for determining whether the at least one friend object indicated in the executed check function statement indicates that the calling function is one of the indicated external functions that can access the sensitive function, wherein each of the at least one associated multiple friend objects indicates a different set of external functions that can access the sensitive function; and permitting the calling function access to the sensitive function in response to determining that the at least one friend object indicates that the calling function is one of the indicated external functions by executing the at least one statement in the sensitive function following the check function statement.

7. The system of claim 6 implemented using the Java programming language.

8. The system of claim 6, wherein a package defines a grouping of rotated classes, wherein the sensitive function is a member of one package that is different from another package with which the calling function is associated.

9. The system of claim 8, wherein the friend object is capable of indicating at least one package, class, and external function, wherein all functions within all classes within one indicated package comprise the indicated external functions that can access the sensitive function, wherein all functions within one indicated class can access the sensitive function, and wherein the indicated external functions can access the sensitive function.

10. The system of claim 6, wherein modifying the external functions indicated in the friend object during runtime occurs when processing conditional logic in a function external to the sensitive function.

11. An article of manufacture for use in controlling access to a sensitive function in a class, the article of manufacture including a plurality of program instructions to cause a computer to perform:
generating a friend object indicating external functions from external classes external to the class including the sensitive function, wherein the external functions indicated in the friend object are capable of being modified during runtime, wherein each sensitive function is capable of being associated with at least one of multiple friend objects, and wherein the sensitive function includes a check function statement indicating at least one friend object followed by at least one statement performing operations associated with the sensitive function;
processing a call from a function in a class external to the class including the sensitive function during runtime;
executing the check function statement in the sensitive function in response to processing the call to the sensitive function;
determining whether the at least one friend object indicated in the executed cheek function statement indicates that the calling function is one of the indicated external functions that can access the sensitive function, wherein each of the at least one associated multiple friend objects indicates a different set of external functions that can access the sensitive function; and
permitting the calling function access to the sensitive function in response to determining that the at least one friend object indicates that the calling function is one of the indicated external functions by executing the at least one statement in the sensitive function following the check function statement.

12. The article of manufacture of claim 11, implemented using the Java programming language.

13. The article of manufacture of claim 11, wherein a package defines a grouping of related classes, wherein the sensitive function is a member of one package that is different from another package with which the calling function is associated.

14. The article of manufacture of claim 13, wherein the friend object is capable of indicating at least one package, class, and external function, wherein all functions within all classes within one indicated package comprise the indicated external functions that can access the sensitive function, wherein all functions within one indicated class can access the sensitive function, and wherein the indicated external functions can access the sensitive function.

15. The article of manufacture of claim 11, wherein modifying the external functions indicated in the friend object during runtime occurs when processing conditional logic in a function external to the sensitive function.

16. A computer readable medium including at least one data structure used for controlling access to a sensitive function in a class, comprising:
a friend object indicating external functions from external classes external to the class including the sensitive function, wherein the sensitive function includes a check function statement indicating at least one friend object followed by at least one statement performing operations associated with the sensitive function; wherein the external functions indicated in the friend object may be dynamically modified during runtime, wherein the check function statement in the sensitive function is executed in response to processing the call to the sensitive function, wherein the friend object in the executed check function statement is checked to determine whether the friend object indicates that the calling function is one of the indicated external functions that can access the sensitive function during execution of the calling function, wherein each sensitive function is capable of being associated with at least one of multiple friend objects, and wherein each of the at least one associated multiple friend objects indicates a different set of external functions that can access the sensitive function; wherein the calling function is permitted access to the sensitive function in response to determining that the at least one friend object indicates that the calling function is one of the indicated external functions by executing the at least one statement in the sensitive function following the check function statement.

17. The computer readable medium of claim 16, wherein the functions are implemented using the Java programming language.

18. The computer readable medium of claim 16, wherein a package defines a grouping of related classes, wherein the sensitive function is a member of one package that is different from another package with which the calling function is associated.

19. The computer readable medium of claim 18, wherein the friend object is capable of indicating at least one package, class, and external function, wherein all functions within all classes within one indicated package comprise the indicated external functions that can access the sensitive function, wherein all functions within one indicated class can access the sensitive function, and wherein the indicated external functions can access the sensitive function.

20. A method for controlling access to a sensitive function in a class, comprising:
generating a friend object indicating external functions from external classes external to the class including the sensitive function, wherein the sensitive function includes a check function statement indicating at least one friend object followed by at least one statement performing operations associated with the sensitive function, and wherein the external functions indicated in the friend object are capable of being modified during runtime;
processing a call from a function in a class external to the class including the sensitive function during runtime;

executing the cheek function statement in the sensitive function in response to processing the call to the sensitive function;

determining whether the friend object indicated in the executed check function statement indicates that the calling function is one of the indicated external functions that can access the sensitive function, and wherein the sensitive function is capable of being associated with at least one of multiple friend objects, wherein different friend objects associated with different sensitive functions in the class allow different sets of external functions access to the sensitive functions; and permitting the calling function access to the sensitive function in response to determining that at least one friend object indicates that the calling function is one of the indicated external functions by executing the at least one statement in the sensitive function following the check function statement.

21. A system for controlling access to a sensitive function in a class, comprising:

means for generating a friend object indicating external functions from external classes external to the class including the sensitive function wherein the sensitive function includes a check function statement indicating at least one friend object followed by at least one statement performing operations associated with the sensitive function and wherein the external functions indicated in the friend object are capable of being modified during runtime;

means for processing a call from a function in a class external to the class including the sensitive function during runtime;

executing the-check function statement in the sensitive function in response to processing the call to the sensitive function;

means for determining whether the friend object indicated in the executed check function statement indicates that the calling function is one of the indicated external functions that can access the sensitive function, and wherein the sensitive function is capable of being associated with at least one of multiple friend objects, wherein different friend objects associated with different sensitive functions in the class allow different sets of external functions access to the sensitive functions; and permitting the calling function access to the sensitive function in response to determining that the at least one friend object indicates that the calling function is one of the indicated external functions by executing the at least one statement in the sensitive function following the check function statement.

22. An article of manufacture for use in controlling access to a sensitive function in a class, the article of manufacture including a plurality of program instructions to cause a computer to perform:

generating a friend object indicating external functions from external classes external to the class including the sensitive function, wherein the sensitive function includes a check function statement indicating at least one friend object followed by at least one statement performing operations associated with the sensitive function, and wherein the external functions indicated in the friend object are capable of being modified during runtime;

processing a call from a function in a class external to the class including the sensitive function during runtime;

executing the check function statement in the sensitive function in response to processing the call to the sensitive function;

determining whether the friend object indicated in the executed check function statement indicates that the calling function is one of the indicated external functions that can access the sensitive function, and wherein the sensitive function is capable of being associated with at least one of multiple friend objects, wherein different friend objects associated with different sensitive functions in the class allow different sets of external functions access to the sensitive functions; and permitting the calling function access to the sensitive functions in response to determining that the at least one friend object indicates that the calling function is one of the indicated external functions by executing the at least one statement in the sensitive function following the check function statement.

* * * * *